US012225519B2

(12) United States Patent
Seok et al.

(10) Patent No.: US 12,225,519 B2
(45) Date of Patent: Feb. 11, 2025

(54) GROUP ADDRESSED FRAME WIRELESS TRANSMISSION FOR CONSTRAINED MULTI-LINK OPERATION (71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 23 days.

(21) Appl. No.: 17/166,882

(22) Filed: Feb. 3, 2021

(65) Prior Publication Data
US 2021/0250963 A1 Aug. 12, 2021

Related U.S. Application Data (60) Provisional application No. 63/006,139, filed on Apr. 7, 2020, provisional application No. 62/991,619, filed
(Continued)

(51) Int. Cl.
*H04W 72/12* (2023.01)
*H04W 4/06* (2009.01)
(Continued)

(52) U.S. Cl.
CPC ......... *H04W 72/1215* (2013.01); *H04W 4/06* (2013.01); *H04W 74/0816* (2013.01); *H04W 84/12* (2013.01)

(58) Field of Classification Search
CPC ..... H04J 11/0063; H04W 4/06; H04W 72/12; H04W 72/1215; H04W 74/0816;
(Continued)

(56) References Cited

U.S. PATENT DOCUMENTS 9,565,582 B2 2/2017 Zhao et al.
9,832,778 B2 11/2017 Behravan et al.
(Continued)

FOREIGN PATENT DOCUMENTS

CN 107079314 A 8/2017
CN 109587052 A 4/2019
(Continued)

OTHER PUBLICATIONS

Insun Jang (LG Electronics): "Considerations for multi-link channel access without simultaneous TX/RX capability",IEEE Draft;11-19-1917-01-00BE-Considerations-For-Multi-Link-Channel-Access-Without-Simultaneous-TX-RX-Capability, IEEE-SA Mentor, Piscataway, NJ USA vol. 802.11 EHT; 802.llbe, No. 1, Jan. 13, 2020 (Jan. 13, 2020), pp. 1-19, XP068165144,Retrieved from the Internet:URL:https://mentor.ieee.org/802.11/dcn/19/.
(Continued)

*Primary Examiner* — Kibrom T Hailu
*Assistant Examiner* — Kai Chang (57) ABSTRACT Multi-link operations can provide higher network throughput and improved network flexibility compared to traditional techniques for wireless communication. Embodiments of the present invention provide a method of frame transmission that prevents constrained MLDs from transmitting and receiving frames on multiple links simultaneously using a novel and reliable group addressed frame transmission schedule for constrained MLDs. Group addressed frames are frames that are transmitted to several devices (e.g., broadcast) listening on a wireless link. It is important to carefully schedule group addressed frames for reception by MLDs to prevent IDC interference. According to some embodiments, group addressed frames are only transmitted when all MLDs listening on a wireless link are not transmitting data to prevent IDC interference.

23 Claims, 9 Drawing Sheets

Related U.S. Application Data on Mar. 19, 2020, provisional application No. 62/975,338, filed on Feb. 12, 2020.

(51) Int. Cl.
*H04W 74/0816* (2024.01)
*H04W 84/12* (2009.01)

(58) Field of Classification Search
CPC ..... H04W 84/12; H04W 8/26; H04W 60/005; H04W 72/0446; H04W 80/06; Y02D 30/70
See application file for complete search history.

(56) References Cited

U.S. PATENT DOCUMENTS

| | | | |
|---|---|---|---|
| 10,334,614 | B1 | 6/2019 | Choi et al. |
| 11,889,435 | B2* | 1/2024 | Seok ................... H04W 76/15 |
| 2006/0187873 | A1 | 8/2006 | Friday et al. |
| 2007/0097919 | A1 | 5/2007 | Tsubota |
| 2013/0100874 | A1 | 4/2013 | Seok |
| 2015/0358786 | A1 | 12/2015 | Kim et al. |
| 2016/0227524 | A1* | 8/2016 | Choi ...................... H04L 5/00 |
| 2018/0317242 | A1 | 11/2018 | Park et al. |
| 2019/0029024 | A1* | 1/2019 | Ryu ..................... H04L 5/1461 |
| 2019/0215884 | A1* | 7/2019 | Patil ..................... H04W 76/15 |
| 2019/0268956 | A1* | 8/2019 | Xiao .................... H04L 45/245 |
| 2020/0396568 | A1* | 12/2020 | Huang .................. H04W 76/40 |
| 2020/0413291 | A1* | 12/2020 | Chu ..................... H04W 76/15 |
| 2021/0014911 | A1* | 1/2021 | Patil ..................... H04W 76/15 |
| 2021/0076412 | A1* | 3/2021 | Naribole .............. H04W 76/38 |
| 2021/0144698 | A1* | 5/2021 | Kwon ................. H04W 28/0215 |
| 2021/0144787 | A1* | 5/2021 | Kwon ................... H04W 76/15 |
| 2021/0176033 | A1* | 6/2021 | Oteri ..................... H04W 72/12 |
| 2021/0195540 | A1* | 6/2021 | Fischer .............. H04W 56/0015 |
| 2021/0212118 | A1* | 7/2021 | Lu ..................... H04W 74/0816 |

FOREIGN PATENT DOCUMENTS

| | | |
|---|---|---|
| EP | 2667682 A1 | 5/2012 |
| WO | 2019032712 A1 | 2/2019 |
| WO | 2019085822 A1 | 5/2019 |

OTHER PUBLICATIONS

Insun Jang (LG Electronics):"Considerations for multi-link channel access without simultaneous TX/RX capability", IEEE Draft; 11-19-1917-01-00BE-Considerations-For-Multi-Link-Channel-Access-Without-Simultaneous-TX-RX-Capability, IEEE-SA Mentor, Piscataway, NJ USA vol. 802.11 EHT; 802.llbe, No. 1, Jan. 13, 2020 (Jan. 13, 2020), pp. 1-19, XP068165144, Retrieved from the Internet: URL:https://mentor.ieee.org/802.11/dcn/19/11-19-1917-01-00be-considerations-for-mult.

Innovation; Summary Table; Search Report; Results Priority Date Range: May 9, 2008-Feb. 11, 2020; 20 pp. Report Run Date: Jul. 6, 2022.

Duncan; et al. "Group Addressed Frame Delivery for EHT" doc.: IEEE 802.11-20/0442r0; 10 pp. Mar. 2020.

Huang; et al; "MLD MAC Address and WM Address" doc.: IEEE 802.11-20/0054r2; 16 pp. Jan. 2020.

Kaiying Lu; et al. Multi-Link Operation and Channel Access Discussion, doc.: IEEE802.11-19/1547R3. 14 pp. Jan. 12, 2020.

* cited by examiner

GROUP ADDRESSED FRAME WIRELESS TRANSMISSION FOR CONSTRAINED MULTI-LINK OPERATION

CROSS-REFERENCE TO RELATED APPLICATIONS

This application claims the benefit of and priority to the following provisional patent applications, each of which is hereby incorporated by reference in their entirety: Ser. No. 62/975,338, with filing date Feb. 12, 2020; Ser. No. 62/991,619, with filing date Mar. 19, 2020; and Ser. No. 63/006,139, with filing date Apr. 7, 2020.

FIELD

Embodiments of the present invention generally relate to the field of wireless communications. More specifically, embodiments of the present invention relate to systems and methods for preventing in-device coexistence (IDC) interference in a wireless network.

BACKGROUND

Modern electronic devices typically send and receive data with other electronic devices wirelessly e.g., using Wi-Fi, and many of these devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and those devices that require greater bandwidth often operate on the 5 GHz band. The availability of the 6 GHz band is a recent advancement and can provide higher performance, lower latency, and faster data rates.

In some cases, the use of a single band may not satisfy the bandwidth needs of certain devices. Therefore, some developing approaches to wireless communication increase communication bandwidth by operating on multiple bands concurrently (this type of communication is technically called link aggregation or multi-link operation). Multi-link operations can provide higher network throughput and improved network flexibility compared to traditional techniques for wireless communication. Moreover, using multi-links enables a wireless device to connect to different wireless bands depending on the conditions of those bands (e.g., traffic, interference, capabilities, etc.), and to switch between the different bands as necessary.

Unfortunately, when a multi-link device (MLD) sends and receives data simultaneously over multiple wireless links in a multi-link operation, in-device coexistence (IDC) interference can cause substantial performance loss during wireless communications. IDC interference caused by simultaneous transmission and reception over a 2.4 GHz band and 5 GHz band is typically negligible. However, IDC interference caused by simultaneous transmission and reception over a 5 GHz band and 6 GHz band can substantially impact performance and lead to frequent packet loss. Therefore, for avoiding the IDC interference, a wireless device should not transmit and receive frames on multi-link simultaneously, which operation can lead to difficulty when scheduling frame transmissions between MLDs.

SUMMARY

Accordingly, embodiments of the present invention provide techniques for wirelessly transmitting frames over multiple links in a multi-link operation between MLDs (e.g., an AP MLD and a non-AP MLD) having multiple wireless stations (STAs). A constrained MLD is a MLD with which in-device coexistence (IDC) interference occurs when more than one STA within the MLD simultaneously transmits and receives frames over multiple links. Embodiments of the present invention provide a method of scheduling frame transmission that prevents constrained MLDs from wirelessly transmitting and receiving frames on multiple links simultaneously using a novel and reliable group addressed frame transmission for constrained MLDs.

According to one embodiment, a method of transmitting a group addressed frame is disclosed. The method includes, determining that a first non-AP MLD is wirelessly transmitting over a first wireless link of a non-simultaneous transmit and receive (NSTR) link pair using an access point (AP) multi-link device (MLD), the AP MLD concurrently wirelessly transmitting an individually addressed frame to a second non-AP MLD over a second wireless link of the NSTR link pair, and the AP MLD wirelessly transmitting a group addressed frame over the second wireless link after the first non-AP MLD is done transmitting, where the first non-AP MLD and second non-AP MLD refrain from transmitting on the NSTR link pair during transmission of the group addressed frame.

According to some embodiments, the wirelessly transmitting the individually addressed frame does not solicit an immediate response from the second non-AP MLD when reception of the immediate response would overlap with the transmitting the group addressed frame.

According to some embodiments, the NSTR link pair includes: a 5 GHz wireless link; and a 6 GHz wireless link.

According to some embodiments, the AP MLD provides scheduling information indicating a schedule for transmitting group addressed frames, where the non-AP MLD does not access the wireless link when the group addressed frames are scheduled to be transmitted according to the scheduling information.

According to some embodiments, the method includes accessing a link configuration provided by the non-AP MLD indicating that the non-AP MLD is listening for group addressed frames on the wireless link, and the AP MLD refraining from scheduling a frame exchange sequence with the non-AP MLD on the wireless link that overlaps with transmission of the group addressed frame.

According to some embodiments, the method includes transmitting scheduling information to the non-AP MLD indicating a schedule for transmitting the group addressed frame, and the non-AP MLD refraining from transmitting on the wireless link when the group addressed frame is scheduled to be transmitted according to the scheduling information.

According to some embodiments, the scheduling information includes a broadcast target wake time (TWT) element, and further including preventing channel access by the non-AP MLD during a TWT service period indicated by the broadcast TWT element.

According to some embodiments, the broadcast TWT element includes a Broadcast TWT Recommendation subfield equal to 0 and a Broadcast TWT ID equal to 0.

According to some embodiments, the method includes assigning a first association ID (AID) to the wireless link and a second AID to a second wireless link of the NSTR link pair, where the first and second AID indicate if broadcast data is buffered on a respective link.

According to some embodiments, the first AID and second AID are carried in a virtual bitmap of a Traffic indication map (TIM) information element.

According to some embodiments, wirelessly transmitting the group addressed frame includes wirelessly transmitting the group addressed frame according to a schedule that substantially prevents in-device coexistence (IDC) interference on NSTR link pair.

According to some embodiments, the method includes accessing an indication from a non-access point (AP) multi-link device (MLD) at an AP MLD that indicates that the non-AP MLD is listening for group addressed frames on a wireless link, and scheduling a group addressed frame for transmission at the AP MLD based on the indication, where the wireless link is associated with to a non-simultaneous transmit and receive (NSTR) link pair, where the non-AP MLD is operable to communicate with the AP MLD using the NSTR link pair, and where the scheduling includes preventing a frame exchange sequence from being scheduled that overlaps with a transmission of a group addressed frame being transmitted on the NSTR link pair.

According to some embodiments, the NSTR link pair includes: a 5 GHz wireless link; and a 6 GHz wireless link.

According to some embodiments, scheduling a group addressed frame further includes scheduling the group addressed frame to substantially prevent in-device coexistence (IDC) interference on NSTR link pair.

According to another embodiment, a method of transmitting a group addressed frame is disclosed. The method includes transmitting scheduling information to a non-access point (AP) multi-link device (MLD) indicating a schedule for transmitting a group addressed frame over a wireless link, and scheduling a group addressed frame for transmission at the AP MLD over the wireless link in accordance with the scheduling information, where the wireless link is associated with to a non-simultaneous transmit and receive (NSTR) link pair, where the non-AP MLD is operable to communicate with the AP MLD using the NSTR link pair, and where the non-AP MLD does not transmit on the NSTR link pair when the group addressed frame is scheduled to be transmitted on the NSTR link pair.

According to some embodiments, the scheduling information includes a broadcast target wake time (TWT) element, and where the scheduling further includes preventing channel access during a TWT service period indicated by the broadcast TWT element.

According to some embodiments, the broadcast TWT element includes a Broadcast TWT Recommendation subfield equal to 0 and a Broadcast TWT ID equal to 0.

According to some embodiments, the method further includes assigning a first association ID (AID) to the wireless link and a second AID to a second wireless link of the NSTR link pair, where the first and second AID indicate if broadcast data is buffered on a respective link.

According to some embodiments, the AID is carried in a virtual bitmap of a Traffic indication map (TIM) information element.

According to some embodiments, the scheduling a group addressed frame includes scheduling the group addressed frame to substantially prevent in-device coexistence (IDC) interference on NSTR link pair.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 6-8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Group Addressed Frame Wireless Transmission for Constrained Multi-Link Operation The term station (STA) refers generally to an electronic device capable of sending and receiving data over Wi-Fi that is not operating as an access point (AP).

Multi-link operations can provide higher network throughput and improved network flexibility compared to traditional techniques for wireless communication. Constrained MLDs are devices that cannot send and receive data over multiple links simultaneously without experiencing IDC interference. Embodiments of the present invention provide a method of wireless frame transmission that prevents constrained MLDs from transmitting and receiving frames on multiple links simultaneously using an advantageous and novel, reliable group addressed frame transmission schedule for constrained MLDs. Group addressed frames are frames that are transmitted to several devices (e.g., broadcast) listening on a wireless link. It is important to transmit group addressed frames for reception by MLDs in a manner that avoids scheduling group addressed frames when the reception of said frames would overlap with a transmission by the receiving constrained MLD.

According to one embodiment, an AP MLD schedules the transmission of group addressed frames during times when all constrained MLDs are not transmitting. However, because the non-AP MLDs (STAs) do not know when the group addressed frames will be transmitted by the AP MLD, the STAs of the non-AP MLDs may attempt to access the wireless channel without any restriction. Therefore, scheduling the transmission of group addressed frames only when all constrained MLDs are not transmitting can be difficult unless the traffic load of the wireless network is relatively low.

Figure 1:
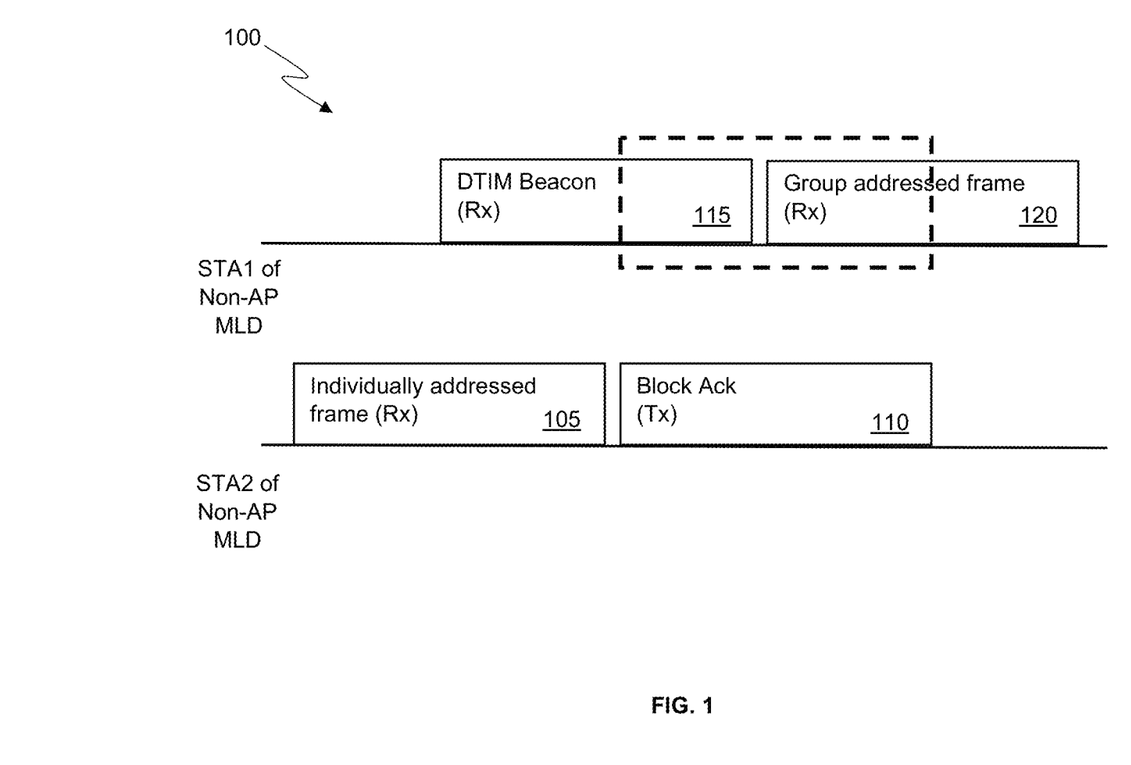
FIG. 1 is a block diagram of an exemplary frame timing diagram of a wireless transmission by an MLD using multiple links that results in IDC interference.

FIG. 1 depicts an exemplary transmission of an MLD using multiple links. The MLD is a non-AP MLD including STA1 and STA2 communicating over respective wireless links. In the example of FIG. 1, STA1 receives an individually addressed frame 105. In response, STA1 transmits a block ack (BA) 110 acknowledging the reception of frame 105. While STA1 is transmitting BA 110, STA2 simultaneously receives a delivery traffic indication map (DTIM) beacon frame 115. Group-addressed frame 120 is received by STA1 after the DTIM beacon frame 115 while the transmission of BA 110 is ongoing. STA1 and ST2 of the non-AP MLD are in communication with the AP MLD over a non-simultaneous transmit and receive (NSTR) link pair. For example, the NSTR link pair can include a 5 GHz wireless link and a 6 GHz wireless link or a 2.4 GHz wireless link and a 5 GHz wireless link, where simultaneous transmission and reception over the links can cause IDC interference.

For example, the simultaneous transmission and reception over STA2 and STA1, respectively, causes IDC interference which can negatively impact the reliability and performance of the wireless transmissions. It is appreciated that, according to embodiments of the present invention, in order to reliably deliver a group addressed frame to a constrained non-AP MLD, the AP MLD does not schedule a frame exchange sequence to a constrained non-AP MLD that overlaps with a group addressed frame transmitted on another link or links.

Figure 2:
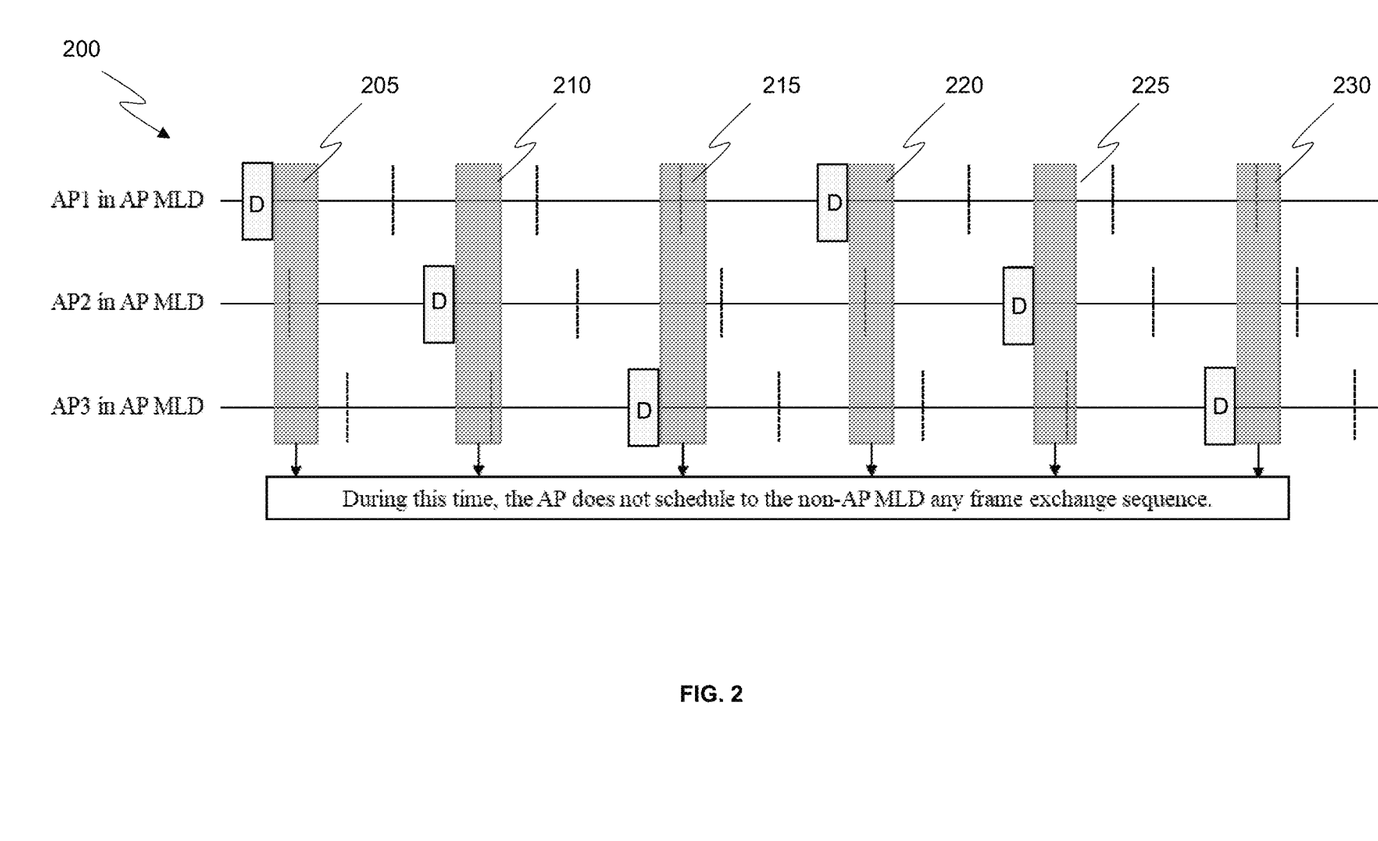
FIG. 2 is a block diagram of an exemplary multi-link operation performed by a wireless AP MLD to prevent or reduce IDC interference according to embodiments of the present invention.

FIG. 2 depicts an exemplary transmission between MLD devices according to embodiments of the present invention. The frames are scheduled for transmission according to a process that prevents a constrained non-AP MLD from transmitting frames that would cause IDC interference without knowledge of the link(s) on which the constrained non-AP MLD is listening for group addressed frames. As depicted in FIG. 2, AP MLD includes AP1, AP2, and AP3. At times 205, 210, 215, 220, 225, and 230, the AP MLD advantageously does not schedule any frame exchange sequences to the non-AP MLD to prevent simultaneous transmission and reception during by the non-AP MLD during these times.

According to some embodiments, the non-AP MLD indicates to the AP MLD which link(s) are being used to listen for group addressed frame. Thereafter, the AP MLD does not schedule any frame exchange sequences to non-AP MLDs that overlap with the group addressed frame on the link or links indicated by the non-AP MLD ("configured link(s)"). Note in FIG. 2 that the AP MLD can transmit downlink data (D) (e.g., an individually addressed frame) at times that are not reserved for group address frame transmission as long as the transmission does not solicit an immediate response that would overlap with the group address frame transmission.

Figure 3:
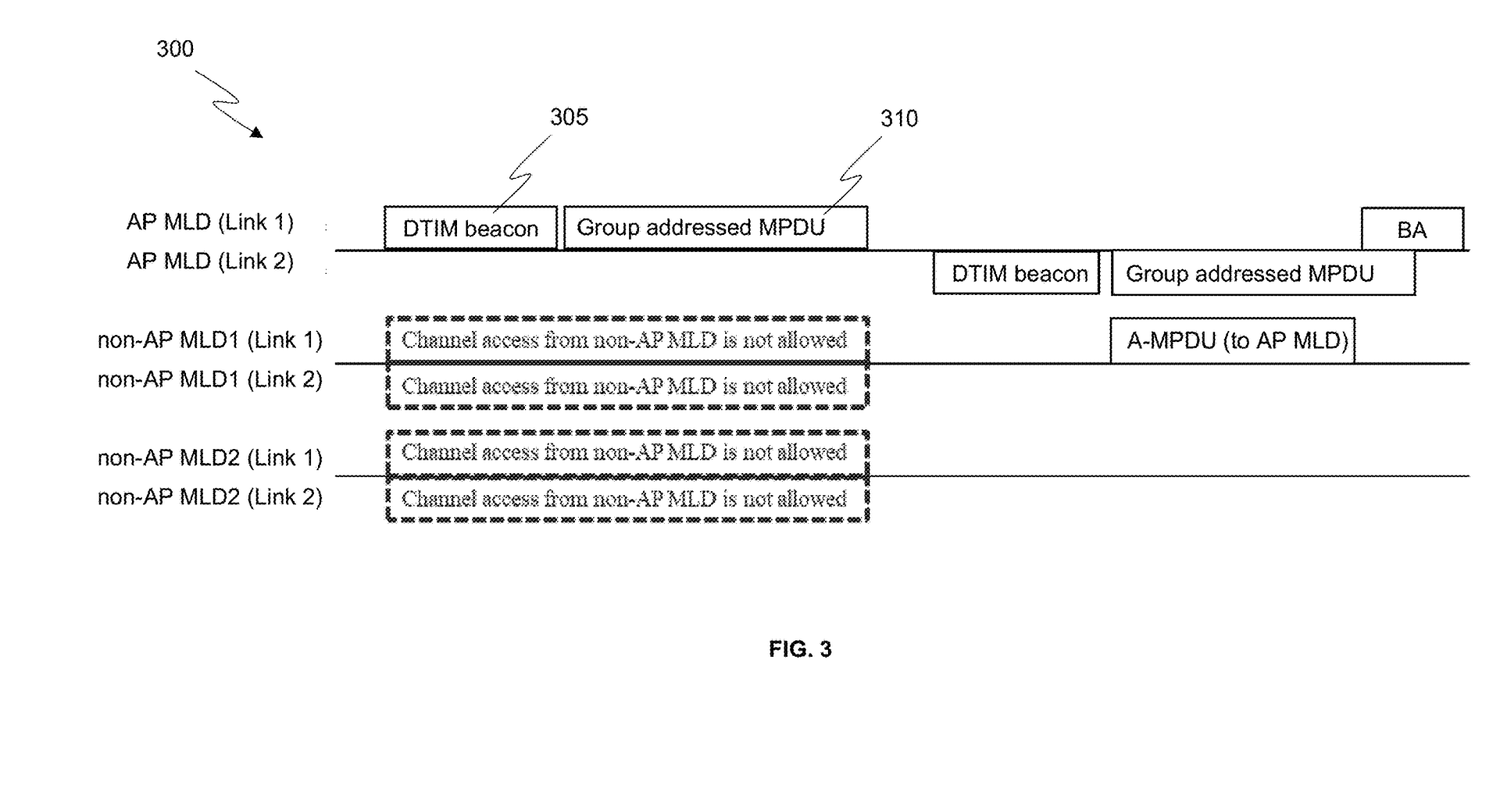
FIG. 3 is a block diagram of an exemplary multi-link operation that prevents frame exchanges by non-AP MLDs when the AP MLD is transmitting a group addressed frame according to embodiments of the present invention.

In the exemplary wireless transmission 300 of FIG. 3, according to embodiments of the present invention, the AP MLD does not schedule any frame exchange sequences to the non-AP MLD that overlap with the group addressed frame on the configured link(s). When the non-AP MLD intends to receive the group addressed frame on the configured link(s), other STAs of the constrained non-AP MLD do not access any channels during the group addressed frame transmission time. The non-AP MLD indicates to the AP MLD the link(s) on which it is listening for the group addressed frame ("link configuration"). Thereafter, the AP MLD does not schedule any frame exchange sequences on another link or links to the non-AP MLD which overlap with the group addressed frame on the configured link(s). In FIG. 3, the DTIM beacon frame 305 and Group addressed MDPU 310 are transmitted to a non-AP MLD over a configured link(s) (indicated by the non-AP MLD), and therefore non-APs MLD1 and MLD2 do not access any channels (or any channel not supporting simultaneous Rx and Tx) on another link or links during the group addressed frame transmission.

Figure 4:
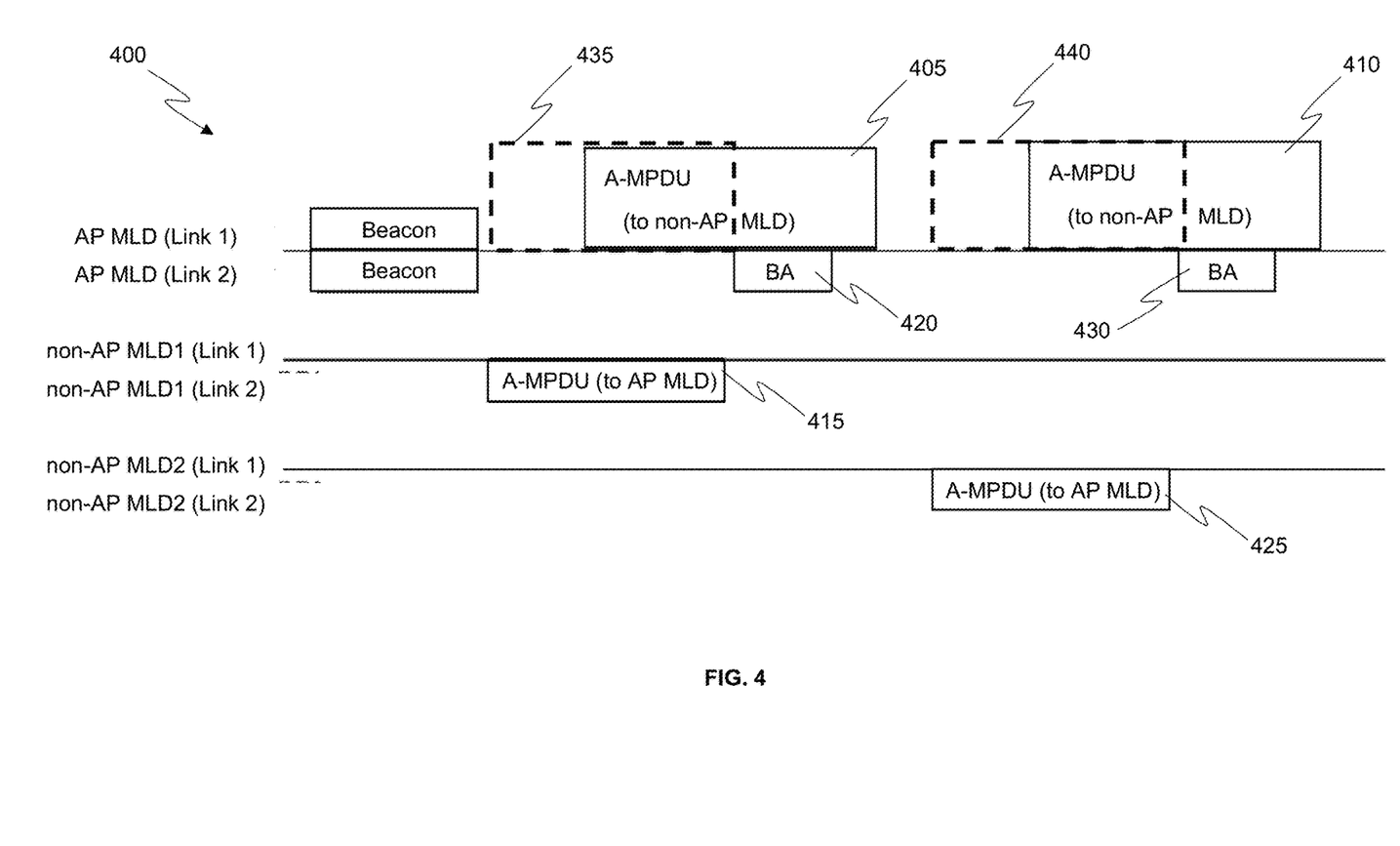
FIG. 4 is a block diagram of an exemplary multi-link operation that does not schedule group addressed frames for transmission while a non-AP MLD is currently transmitting on a link of a NSTR link pair according to embodiments of the present invention.

FIG. 4 depicts an exemplary wireless transmission 400 that prevents IDC interference by constrained MLDs according to embodiments of the present invention. In general, the AP MLD does not wirelessly transmit a frame that solicits an immediate response to a STA of a non-AP MLD on a link that belongs to a non-simultaneous transmit and receive (NSTR) link pair(s) for that non-AP MLD when the immediate response is expected to overlap in time with group addressed MPDUs scheduled on another link or links of the NSTR link pairs, and the non-AP MLD is expected to be receiving the group addressed MPDUs.

In the example of FIG. 4, the AP MLD receives A-MPDU (e.g., an individually addressed frame) from non-AP MLD1 over Link 2 followed by A-MPDU from non-AP MLD2 over Link 2. Responsive to the A-MPDUs received over Link 2, the AP MLD transmits BAs 415 and 420. The AP MLD transmits individually addressed A-MPDUs 425 and 430 over Link 1 the non-AP MLDs. The AP MLD schedules group addressed frames only when all constrained MLDs are not transmitting. Accordingly, the AP MLD does not transmit group addressed frames during time periods 425 and 410 while non-AP MLD1 is transmitting A-MPDU 410 and while receiving BA 415 to prevent IDC interference.

According to some embodiments of the present invention, an AP MLD provides scheduling information for transmitting group addressed frames to constrained non-AP MLDs. The constrained non-AP MLDs that intend to receive group addressed frames do not access the channel (on all links not supporting simultaneous Rx and Tx) during the time scheduled for transmitting group addressed frames as indicated by the scheduling information. Scheduling information for transmitting group addressed frames can be broadcasted to the constrained non-AP MLDs using a target wake time (TWT) element, for example. The TWT element can be included in a beacon frame sent by an AP MLD.

According to some embodiments, a TWT scheduling AP advertises a broadcast TWT with a Broadcast TWT ID field set to 0. The TWT scheduling AP can schedule delivery of group addressed downlink (DL) buffer units (BUs) during the broadcast TWT service periods (SPs) within the beacon interval that follows the DTIM Beacon frame when the TWT parameter set indicates non-trigger enabled unannounced TWT SP and has a Broadcast TWT Recommendation subfield equal to 0. In this case, constrained non-AP MLDs do not access the channel (on all links not supporting simultaneous Rx and Tx) during the broadcast TWT SPs if it intends to receive the group addressed frames.

Figure 5:
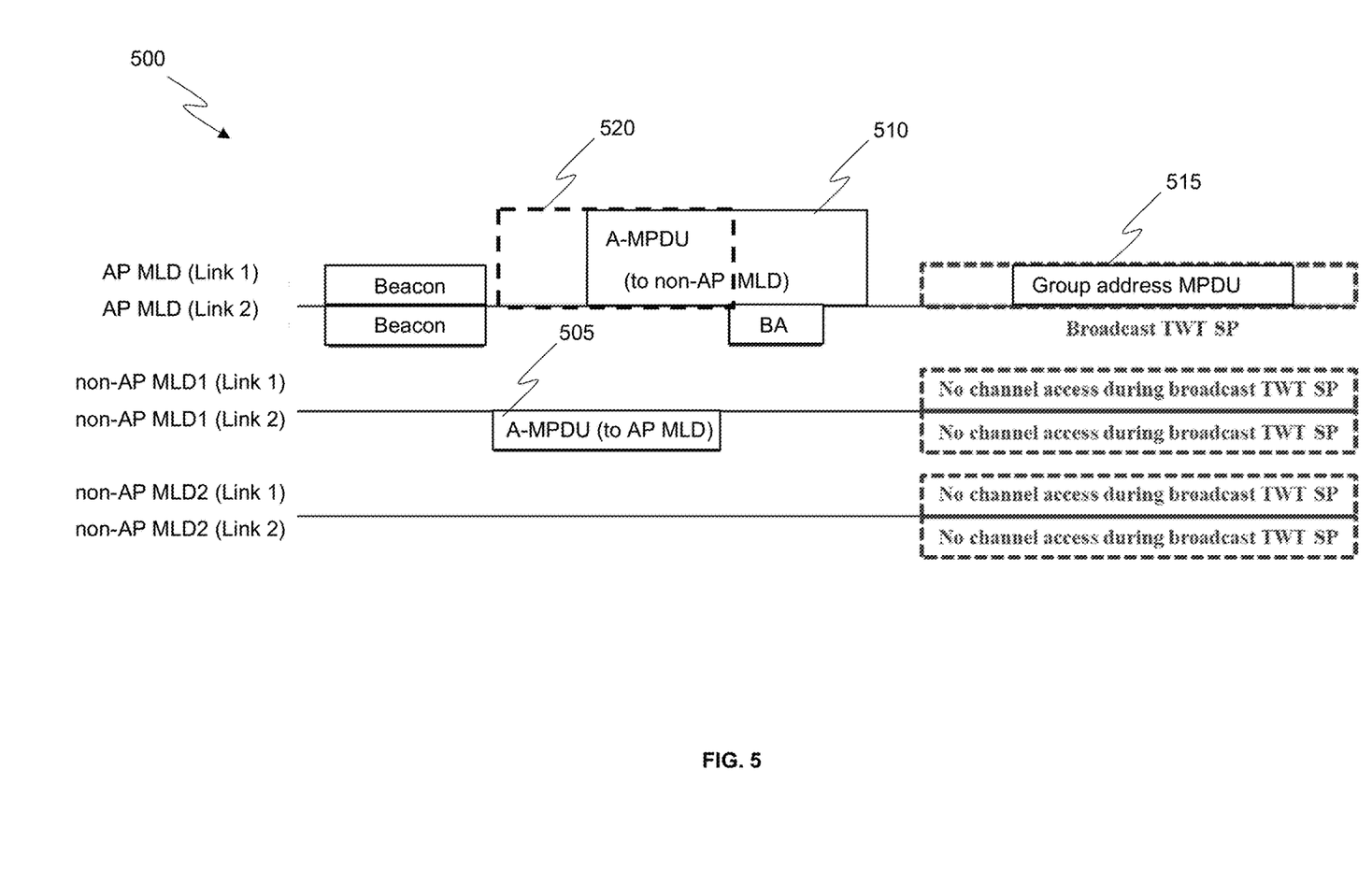
FIG. 5 is a block diagram of an exemplary multi-link operation that prevents channel access by non-AP MLDs during a broadcast TWT SP used to transmit a group addressed frame according to embodiments of the present invention.

FIG. 5 depicts an exemplary wireless transmission 500 (using MLDs) that prevents IDC interference using a TWT element to broadcast scheduling information for group addressed frames according to embodiments of the present invention. In the example of FIG. 5, the AP MLD does not transmit a group addressed frame on Link 1 when another MLD is transmitting A-MPDU 505 to the AP MLD (time period 520). The AP MLD can transmit individually addressed A-MPDU 510 to a non-AP MLD. Subsequently, during a broadcast TWT SP indicated by a broadcast TWT with a Broadcast TWT ID field set to 0, the AP MLD transmits group addressed MPDU 515. During this time, non-AP MLD1 and non-AP MLD2 cannot access the channel, and IDC interference caused by simultaneous transmission and reception by constrained MLDs is prevented or substantially reduced.

When the transmission of multicast data is overloaded, a constrained non-AP MLD may not join to the corresponding multicast group and is prevented from accessing the channel on links not supporting the simultaneous Rx and Tx during the scheduled time of the group addressed frame, which can degrade the performance of multi-link operations (MLO). According to some embodiments, for each link (e.g., Link 1 and Link 2 depicted above), the AP MLD assigns one Association ID (AID) indicating whether the broadcast data (excluding the multicast data) is buffered on the corresponding link. If the bit position of that AID is set to 1 (e.g., in a virtual bitmap in the Traffic indication map (TIM) information element), the non-AP MLD does not access the channel (on all links not supporting the simultaneous Rx and Tx) during the scheduled time of the group addressed frame. According to other embodiments, a non-AP MLD that does not join the multicast group does not have any restriction on channel access.

According to some embodiments, for each multicast group, the AP MLD can provide buffer status using a Fixed Mobile Substitution (FMS) Descriptor information element. In this case, if the non-AP MLD does not join to the multicast group on which the AP MLD has buffered the frame, the non-AP MLD has no restriction on channel access.

Figure 6:
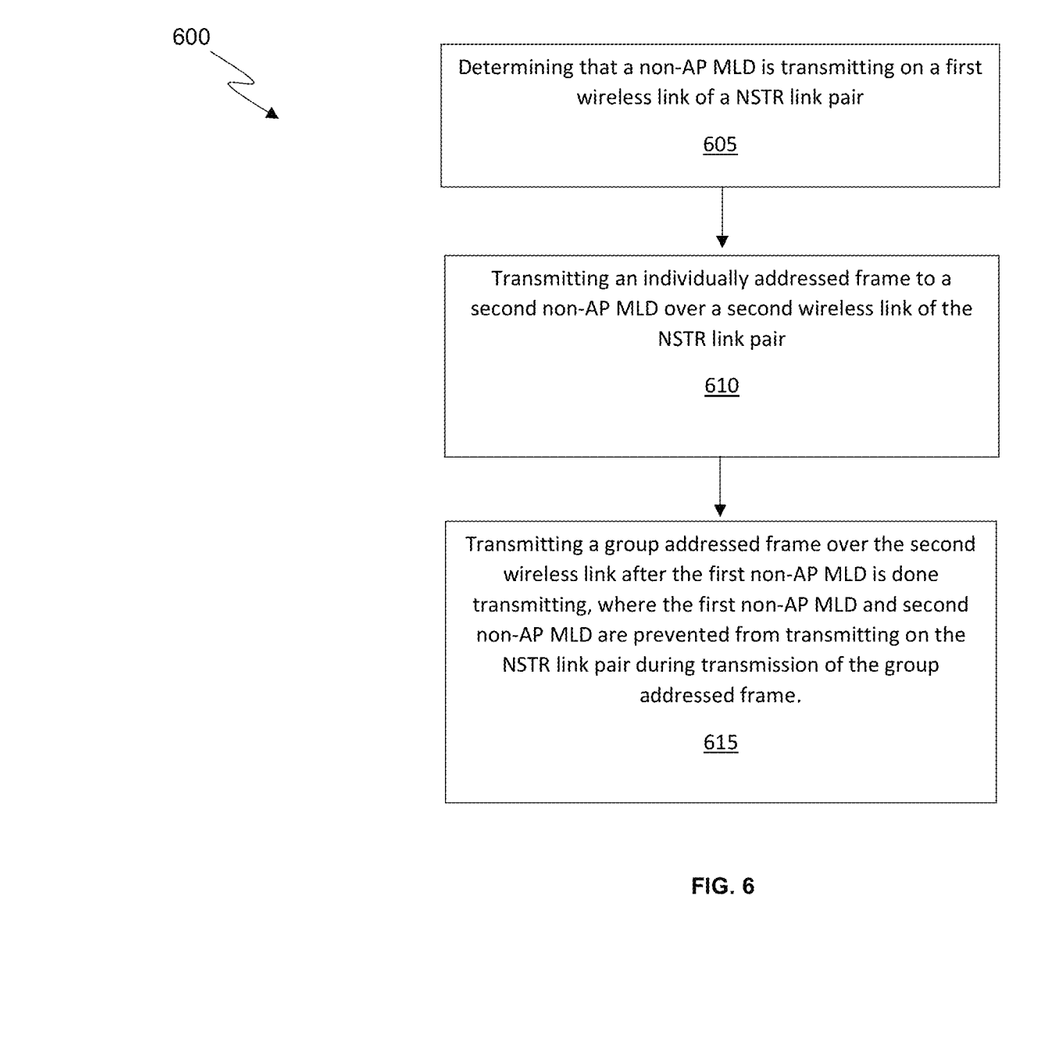
FIG. 6 is a flow chart of an exemplary computer implemented process for wirelessly transmitting a group addressed frame to a non-AP MLD to substantially prevent IDC interference according to embodiments of the present invention.

FIG. 6 depicts an exemplary sequence of computer-implemented steps of a process 600 for wirelessly transmitting a group addressed frame to a constrained MLD to substantially prevent IDC interference according to embodiments of the present invention.

At step 605, an AP MLD determines that a first non-AP MLD is transmitting on a first wireless link of a NSTR link pair.

At step 610, responsive to the determination of step 605, an individually addressed frame is transmitted by the AP MLD to a second non-AP MLD over a second wireless link of the NSTR link pair.

At step 615, a group addressed frame is wirelessly transmitted over the second wireless link after the first non-AP MLD is done transmitting on the first wireless link. The first non-AP MLD and second non-AP MLD are advantageously prevented from transmitting on the NSTR link pair during transmission of the group addressed frame, for example, as indicated by a broadcast TWT with a Broadcast TWT ID field set to 0.

Figure 7:
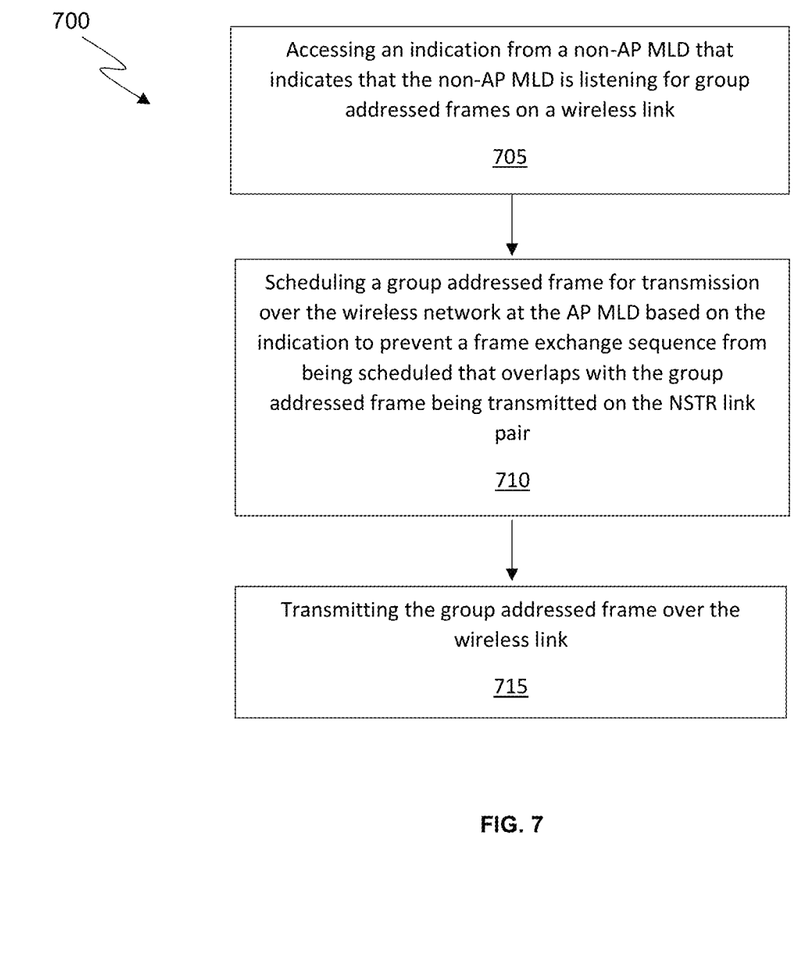
FIG. 7 is a flow chart of an exemplary computer implemented process for transmitting a group addressed frame to a non-AP MLD to substantially prevent IDC interference based on link configuration information according to embodiments of the present invention.

FIG. 7 depicts an exemplary sequence of computer-implemented steps of a process 700 for wirelessly transmitting a group addressed frame to a constrained MLD to substantially prevent IDC interference based on link configuration information according to embodiments of the present invention.

At step 705, an indication is accessed or received from a non-AP MLD that indicates that the non-AP MLD is listening for group addressed frames on a wireless link.

At step 710, responsive to the determination at step 705, a group addressed frame for transmission over the wireless network is scheduled at the AP MLD based on the indication to prevent a frame exchange sequence from being scheduled that overlaps with the group addressed frame being transmitted on the NSTR link.

At step 715, the group addressed frame is wirelessly transmitted over the wireless link as scheduled by the AP MLD.

Figure 8:
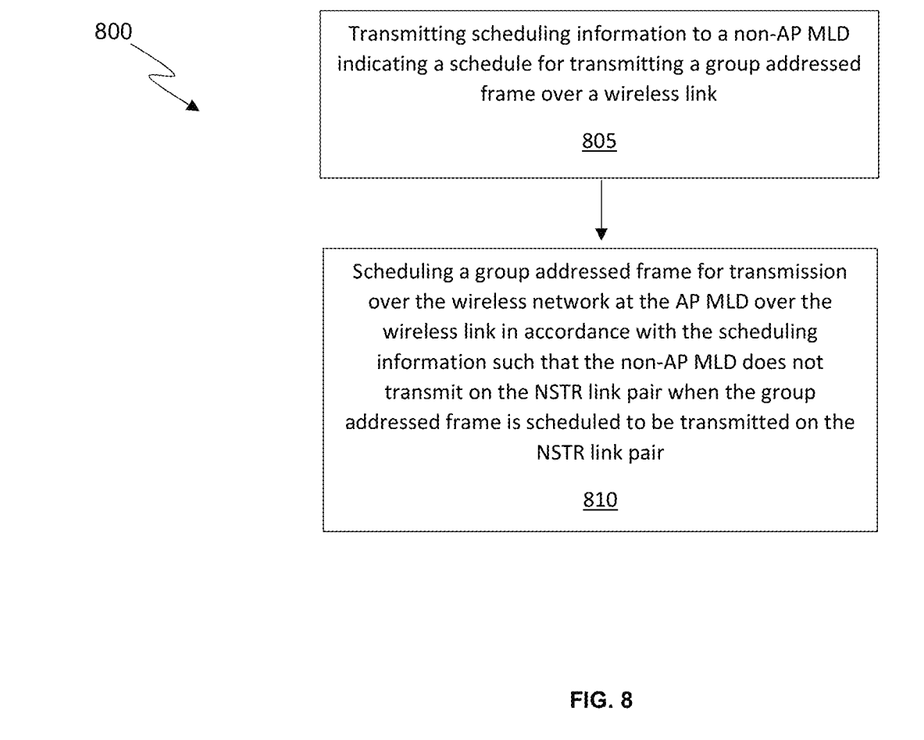
FIG. 8 is a flow chart of an exemplary computer implemented process for transmitting a group addressed frame to a non-AP MLD to substantially prevent IDC interference by transmitting scheduling information to the non-AP MLD according to embodiments of the present invention.

FIG. 8 depicts an exemplary sequence of computer-implemented steps of a process 800 for wirelessly transmitting a group addressed frame to a constrained MLD to substantially prevent IDC interference based on link configuration information according to embodiments of the present invention.

At step 805, scheduling information is transmitted to a non-AP MLD indicating a schedule for transmitting a group addressed frame over a wireless link. The scheduling information can be broadcast in a TWT information element, for example.

At step 810, responsive to the schedule of step 805, a group addressed frame is scheduled for wireless transmission over the wireless network at the AP MLD in accordance with the scheduling information. The non-AP MLD refrains from transmitting on the NSTR link pair when the group addressed frame is scheduled to be transmitted on the NSTR link pair.

Figure 9:
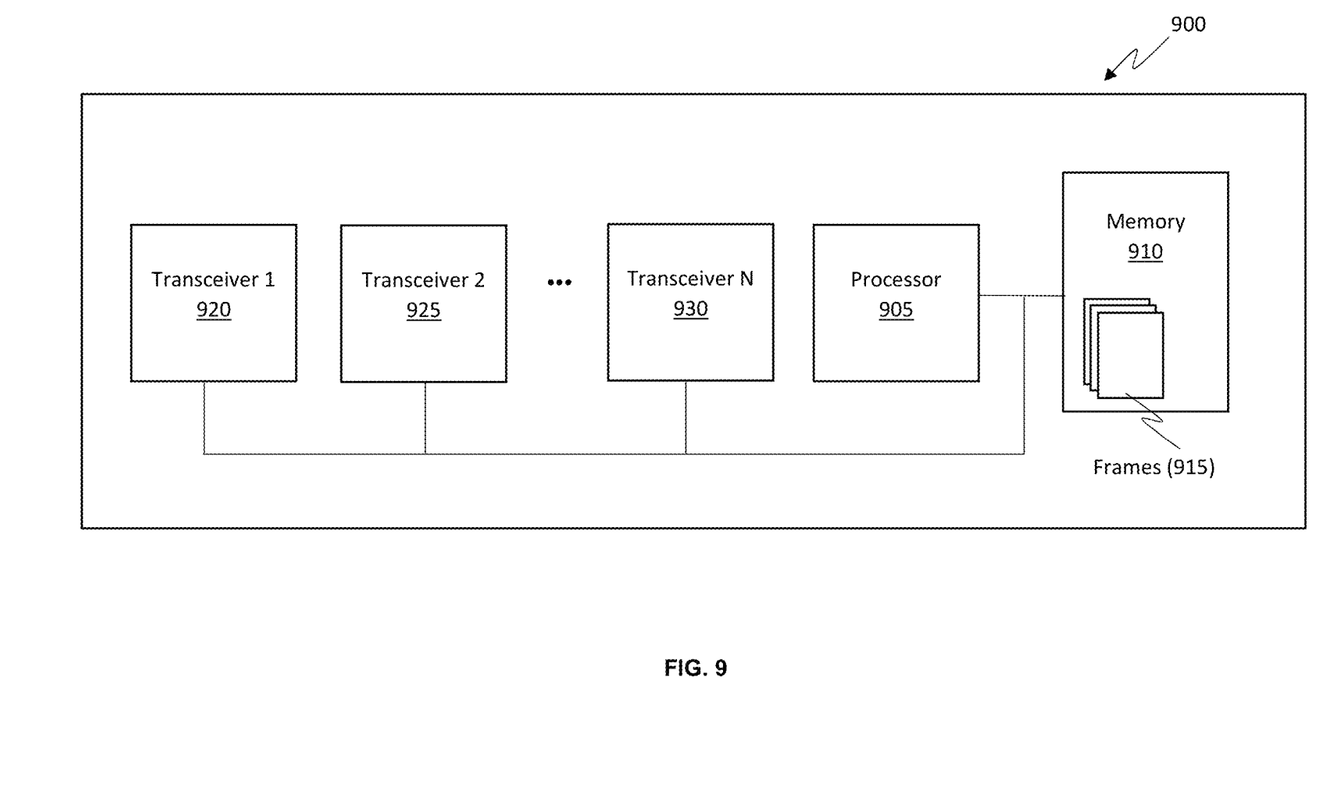
FIG. 9 is a block diagram depicting an exemplary computer system platform upon which embodiments of the present invention may be implemented.

FIG. 9 depicts an exemplary wireless device 900 upon which embodiments of the present invention can be implemented. The wireless device 900 can be a mobile electronic device, a wireless AP, a wireless STA, or any suitable computer system, for example. The wireless device 900 includes a processor 905 for running software applications and optionally an operating system. Memory 910 can include read-only memory and/or random access memory, for example, to store applications and data for use by the processor 905, as well as frames 915 (e.g., data frames) that are received or transmitted by transceivers 920, 925, and 930. The wireless device 900 can include fewer or more transceivers according to some embodiments. The transceivers 920, 925, 930 communicate with other electronic devices over a wireless network (e.g., WLAN) and typically operates according to IEEE standards (e.g., IEEE 802.11ax, IEEE 802.11ay, IEEE 802.11be, etc.).

According to embodiment of the present invention, the processor can execute memory-resident instructions to schedule group addressed frames for avoiding IDC interference by preventing transmission of frames by non-AP MLDs when a group addressed frame is scheduled for wireless transmission. In accordance with embodiments of the present invention, the processor can generate and transmit scheduling information used by the non-AP MLDs for scheduling frame transmissions that do not overlap with planned group addressed frame transmissions. The processor can also receive or access link configuration information from non-AP MLDs for scheduling group addressed frame transmissions that do not overlap with data transmissions on the same NSTR link pair.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting a group addressed frame, the method comprising:
   at an access point (AP) multi-link device (MLD), determining that a first non-AP MLD is wirelessly transmitting over a first wireless link of a non-simultaneous transmit and receive (NSTR) link pair;
   the AP MLD wirelessly transmitting an individually addressed frame to a second non-AP MLD over a second wireless link of the NSTR link pair; and
   the AP MLD wirelessly transmitting a group addressed frame to be received by the second non-AP MLD over the second wireless link after the first non-AP MLD is done transmitting, wherein the first non-AP MLD and second non-AP MLD refrain from transmitting on the NSTR link pair during transmission of the group addressed frame without changing wireless links.

2. The method of claim 1, wherein the wirelessly transmitting the individually addressed frame does not solicit an immediate response from the second non-AP MLD when reception of the immediate response would overlap with the transmitting the group addressed frame.

3. The method of claim 1, wherein the NSTR link pair comprises: a 5 GHz wireless link; and a 6 GHz wireless link.

4. The method of claim 1, further comprising the AP MLD providing scheduling information indicating a schedule for transmitting group addressed frames, wherein the non-AP MLD does not access the wireless link when the group addressed frames are scheduled to be transmitted according to the scheduling information.

5. The method of claim 1, further comprising:
   accessing a link configuration provided by the non-AP MLD indicating that the non-AP MLD is listening for group addressed frames on the wireless link; and
   the AP MLD refraining from scheduling a frame exchange sequence with the non-AP MLD on the wireless link that overlaps with transmission of the group addressed frame.

6. The method of claim 1, further comprising:
   transmitting scheduling information to the non-AP MLD indicating a schedule for transmitting the group addressed frame; and
   the non-AP MLD refraining from transmitting on the wireless link when the group addressed frame is scheduled to be transmitted according to the scheduling information.

7. The method of claim 6, wherein the scheduling information comprises a broadcast target wake time (TWT) element, and further comprising preventing channel access by the non-AP MLD during a TWT service period indicated by the broadcast TWT element.

8. The method of claim 7, wherein the broadcast TWT element comprises a Broadcast TWT Recommendation subfield equal to 0 and a Broadcast TWT ID equal to 0.

9. The method of claim 6, further comprising assigning a first association ID (AID) to the wireless link and a second AID to a second wireless link of the NSTR link pair, wherein the first and second AID indicate if broadcast data is buffered on a respective link.

10. The method of claim 9, wherein the first AID and second AID are carried in a virtual bitmap of a Traffic indication map (TIM) information element.

11. The method of claim 1, wherein the wirelessly transmitting the group addressed frame comprises wirelessly transmitting the group addressed frame according to a schedule that substantially prevents in-device coexistence (IDC) interference on NSTR link pair.

12. A method of transmitting a group addressed frame, the method comprising:
   accessing an indication from a non-access point (AP) multi-link device (MLD) at an AP MLD that indicates that the non-AP MLD is listening for group addressed frames on a wireless link; and
   scheduling a group addressed frame for transmission at the AP MLD based on the indication, wherein the wireless link is associated with to a non-simultaneous transmit and receive (NSTR) link pair, wherein the non-AP MLD is operable to communicate with the AP MLD using the NSTR link pair, and wherein further the scheduling comprises preventing a frame exchange sequence from being scheduled that overlaps with a transmission of a group addressed frame to be received by the non-AP MLD on the NSTR link pair without changing wireless links.

13. The method of claim 12, wherein the NSTR link pair comprises: a 5 GHz wireless link; and a 6 GHz wireless link.

14. The method of claim 12, wherein the scheduling a group addressed frame further comprises scheduling the group addressed frame to substantially prevent in-device coexistence (IDC) interference on NSTR link pair.

15. A method of transmitting a group addressed frame, the method comprising:
   transmitting scheduling information to a non-access point (AP) multi-link device (MLD) indicating a schedule for transmitting a group addressed frame over a wireless link; and
   scheduling a group addressed frame for transmission at the AP MLD over the wireless link in accordance with the scheduling information, wherein the wireless link is associated with to a non-simultaneous transmit and receive (NSTR) link pair, wherein the non-AP MLD is operable to communicate with the AP MLD using the NSTR link pair, and wherein the non-AP MLD does not transmit to the AP MLD on the NSTR link pair when the group addressed frame is scheduled to be transmitted and received by the non-AP MLD on the wireless link of the NSTR link pair without changing wireless links.

16. The method of claim 15, wherein the scheduling information comprises a broadcast target wake time (TWT) element, and wherein the scheduling further comprises preventing channel access during a TWT service period indicated by the broadcast TWT element.

17. The method of claim 16, wherein the broadcast TWT element comprises a Broadcast TWT Recommendation subfield equal to 0 and a Broadcast TWT ID equal to 0.

18. The method of claim 15, further comprising assigning a first association ID (AID) to the wireless link and a second AID to a second wireless link of the NSTR link pair, wherein the first and second AID indicate if broadcast data is buffered on a respective link.

19. The method of claim 18, wherein the AID is carried in a virtual bitmap of a Traffic indication map (TIM) information element.

20. The method of claim 15, wherein the scheduling a group addressed frame comprises scheduling the group addressed frame to substantially prevent in-device coexistence (IDC) interference on NSTR link pair.

21. An access point (AP) multi-link device (MLD) for transmitting a group addressed frame in a wireless network, the AP MLD comprising:
   a transceiver configured to send and receive data over the wireless network; and
   a processor operable to:
      determine that a first non-AP MLD is wirelessly transmitting over a first wireless link of a non-simultaneous transmit and receive (NSTR) link pair;
      wirelessly transmit an individually addressed frame to a second non-AP MLD over a second wireless link of the NSTR link pair; and
      wirelessly transmit a group addressed frame to be received by the second non-AP MLD over the second wireless link after the first non-AP MLD is done transmitting, wherein the first non-AP MLD and second non-AP MLD refrain from transmitting on the NSTR link pair during transmission of the group addressed frame without changing wireless links.

22. The AP MLD of claim 21, wherein the wirelessly transmit the individually addressed frame does not solicit an immediate response from the second non-AP MLD when reception of the immediate response would overlap with the transmitting the group addressed frame.

23. The AP MLD of claim 21, wherein the NSTR link pair comprises: a 5 GHz wireless link; and a 6 GHz wireless link.

* * * * *